US007280852B2

(12) United States Patent
Shimizu et al.

(10) Patent No.: US 7,280,852 B2
(45) Date of Patent: Oct. 9, 2007

(54) IN-VEHICLE HANDS-FREE APPARATUS

(75) Inventors: Naoyuki Shimizu, Osaka (JP); Teruaki Ata, Ibaraki (JP); Susumu Ibaraki, Sakai (JP); Toshiaki Mori, Mino (JP); Toshikazu Hattori, Kadoma (JP); Akihiro Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 786 days.

(21) Appl. No.: 10/673,216

(22) Filed: Sep. 30, 2003

(65) Prior Publication Data
US 2004/0063472 A1  Apr. 1, 2004

(30) Foreign Application Priority Data
Sep. 30, 2002  (JP) ............................. 2002-286750

(51) Int. Cl.
H04M 1/00  (2006.01)
(52) U.S. Cl. .................................. 455/569.2; 455/569.1
(58) Field of Classification Search ............ 455/569.1, 455/569.2; 701/1, 29, 33, 34
See application file for complete search history.

(56) References Cited

U.S. PATENT DOCUMENTS

| 6,018,671 | A | * | 1/2000 | Bremer ...................... 455/567 |
| 6,353,778 | B1 | * | 3/2002 | Brown ......................... 701/1 |
| 6,580,973 | B2 | * | 6/2003 | Leivian et al. ................ 701/1 |
| 6,718,187 | B1 | * | 4/2004 | Takagi et al. ............ 455/569.2 |
| 6,731,925 | B2 | * | 5/2004 | Naboulsi .................... 455/345 |
| 7,092,496 | B1 | * | 8/2006 | Maes et al. ............... 379/88.01 |
| 2002/0151297 | A1 | * | 10/2002 | Remboski et al. ........... 455/414 |
| 2002/0177928 | A1 | * | 11/2002 | Moriguchi et al. ............. 701/1 |
| 2004/0209656 | A1 | * | 10/2004 | Kitami et al. ............. 455/569.1 |
| 2004/0252027 | A1 | * | 12/2004 | Torkkola et al. ............. 340/576 |
| 2005/0090279 | A9 | * | 4/2005 | Witkowski et al. ....... 455/550.1 |
| 2006/0271365 | A1 | * | 11/2006 | Maes et al. .................. 704/254 |

FOREIGN PATENT DOCUMENTS

JP  10-49191  2/1998
JP  10-304464  11/1998

OTHER PUBLICATIONS

Ito et al., Speaking Speed Converter, Feb. 20, 1998, Translation of Japanese Publication # JP10-049191, see [0006; 0036].*

* cited by examiner

*Primary Examiner*—Edan Orgad
*Assistant Examiner*—Fayyaz Alam
(74) *Attorney, Agent, or Firm*—Wenderoth, Lind & Ponack, L.L.P.

(57) ABSTRACT

An in-vehicle hands-free apparatus includes: a communication unit which is connected with a mobile phone; a storage unit for storing a voice of a party on the other end of a call; a situation analysis unit for analyzing surrounding situations of a car based on information outputted from a group of sensors for detecting the surrounding situations; an action determination unit for determining, based on the result of the analysis of the situation analysis unit, to continue or hold the call between a driver and the party, or cancel the hold; a playback control unit for playing back the voice of the party stored in the storage unit according to a control signal outputted based on the determination by the action determination unit to cancel the hold; and a voice output unit for outputting the voice played back by the playback control unit for the driver.

19 Claims, 9 Drawing Sheets

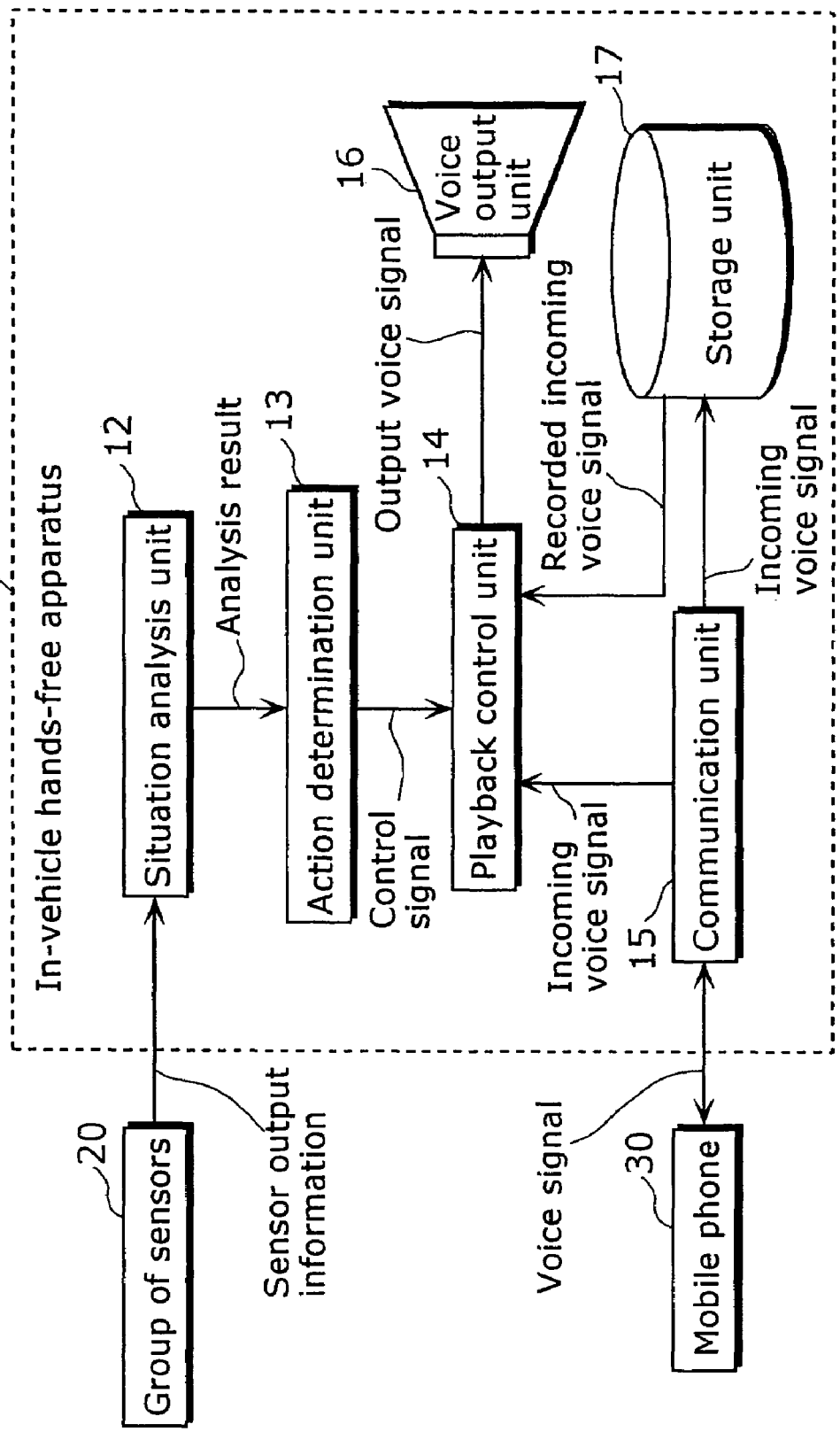

Fig. 4

| Sensor Type | Detection | Situation judged from Detection | Situation Category | Determined Action |
|---|---|---|---|---|
| Blinker + Car speed sensor | Blinker ON and Car speed | Right or left turn · Merge into main lane · Change lane | Driver's viewpoint moves excessively | Hold a call |
| Gear | Reverse gear | Move backward | | |
| Blinker + Obstacle sensor · Range sensor | Blinker ON and Obstacle ahead or behind of car | Start from road shoulder · Stop at road shoulder · Merge into main lane · Change lane | | |
| Obstacle sensor Range sensor | Obstacle within a predetermined range from car | Obstacle | | |
| Range sensor | Distance between cars within a predetermined range | Short distance between cars | Driver hardly grasps surrounding situation | |
| GPS terminal | Judged as dangerous terrain based on map data | Complicated and dangerous terrain | | |
| Wiper + Light | Wiper in full swing and Light ON | Low visibility | | |
| Car speed sensor + ETC terminal | Overspeed excessively | Overspeed | | |
| Noise sensor | Noise over a predetermined level | Noise detection | Driver hardly listens to voice | |
| Acceleration sensor | Sudden slowdown | Driver's danger detection | Driver judges dangerous | |
| Horn | Horn ON | | | |
| Push-button switch | Push-button switch ON | | | |
| Emergency notification apparatus (HELP) | HELP activated | Accident | Accident has occurred | |
| Airbag | Airbag activated | | | |
| Each of above devices | Conditions exclusive of above | Non-dangerous situation | Non-dangerous situation | Continue a call Cancel a hold |

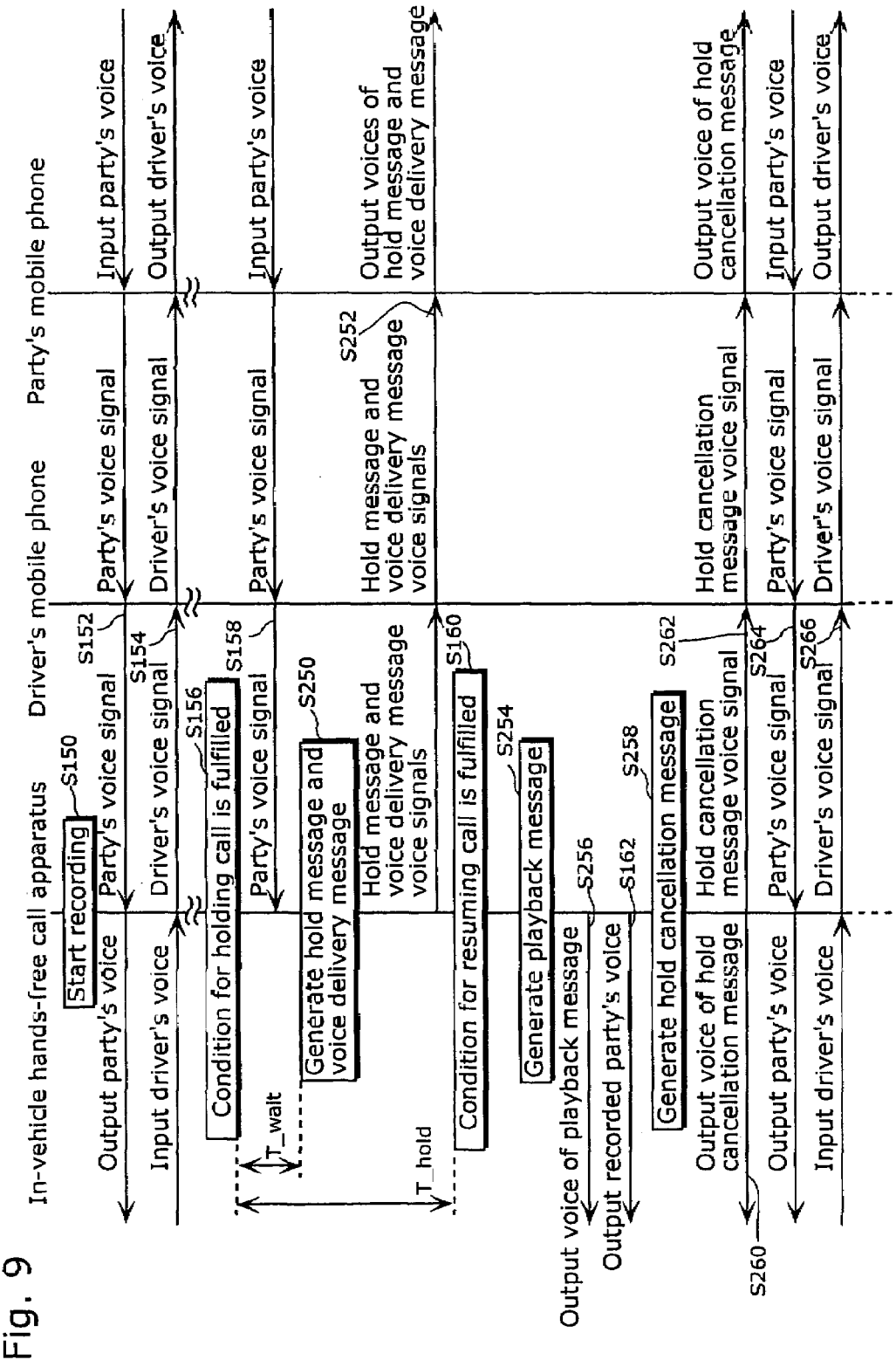

IN-VEHICLE HANDS-FREE APPARATUS

BACKGROUND OF THE INVENTION (1) Field of the Invention

The present invention relates to an in-vehicle hands-free apparatus that allows a telephone call without holding a car phone or a mobile phone while driving.

(2) Description of the Related Art

There have been conventional in-vehicle hands-free apparatuses that allow drivers to talk over the phones without holding car phones or mobile phones provided in the cars.

As an example of these apparatuses, an in-vehicle hands-free apparatus that allows a user, namely, a driver thereof, to hold or resume a call depending on situations of his own and his car is known. (See Japanese Laid-Open Patent Application No. H10-304464, for example.)

FIG. 1 is a flowchart showing control of a conventional in-vehicle hands-free apparatus.

According to this flow, the conventional in-vehicle hands-free apparatus controls a hands-free call, based on navigation data and speed of a car captured during the call, so as to hold the call by sending a driver and his party of the call a message notifying that the call is to be held for a while when it is expected that heavy-loaded driving performance is required for the driver, for example, the car is about to arrive at a junction point and merge into a main lane of an expressway within a predetermined time, and to cancel the hold when the driver or the car returns to the normal condition. It also controls a call in the same manner so as to hold the call by sending a message notifying that the call is to be held for a while when it is judged that heavy load of driving performance is being put on a driver because various sensors for detecting running conditions of a car detect the car in hard cornering or the like, and to cancel the hold when the car or the driver returns to the normal condition.

However, according to the above-mentioned in-vehicle hands-free apparatus, a call is held unilaterally on a user's (a driver's) side without prior notice, so what his party says could be lost if the hold of the call interrupts his talk.

Therefore, even if the call is resumed after the hold is cancelled, the driver cannot understand what his party said due to insufficient communication. The party also cannot understand how far his talk has been delivered to the driver, so he needs to repeat what he said or confirm that the driver has grasped what he said, and thus cannot return to the call smoothly. That is a problem.

In addition, interruption of conversation may cause a driver's mind to be occupied with what the following conversation will be, depending on what they have talked, and thus he is in danger of losing his concentration on driving.

SUMMARY OF THE INVENTION

Against this background, the present invention is conceived in view of these problems, and aims at providing an in-vehicle hands-free apparatus that allows smooth and quick return to a call even from a hold of a call on canceling the hold without losing the contents of conversation.

In order to achieve the above object, the in-vehicle hands-free apparatus according to the present invention takes the following technical measures:

The in-vehicle hands-free apparatus according to the present invention is an in-vehicle hands-free apparatus for making a hands-free call using a telephone in a car, comprising: a storage unit operable to store a voice of a party on the other end of the hands-free call uttered during said call; a situation analysis unit operable to analyze a surrounding situation of the car based on information outputted from at least one sensor for detecting the surrounding situation; an action determination unit operable to determine an action on a state of the call between a user of the telephone and the party based on a result of the analysis of the situation analysis unit; and a playback output unit operable to play back the voice of the party stored in the storage unit based on the action determined by the action determination unit and output said voice for the user. As just described, the party's voice can be recorded and played back even if the call is held, so the driver can return to the call without losing what the party said during the hold.

Here, the playback output unit plays back the voice of the party stored in the storage unit and outputs said voice for the user when the action determination unit switches the state of the call from the hold state to the call state after switching from the call state to the hold state. As just described, the party's voice is played back before the call is resumed after the hold is cancelled, so the driver can return to the call smoothly. That is an effect of the present invention.

Furthermore, the playback output unit includes a playback speed control unit operable to control a playback speed of the voice of the party stored in the storage unit and an elapsed time measurement unit operable to measure a time which has elapsed since the action determination unit switched the state of the call from the call state to the hold state, and the playback speed control unit plays back the voice of the party stored in the storage unit at a speed faster than a normal speed in a case where the elapsed time measured by the elapsed time measurement unit is equal to or longer than a predetermined threshold. As just described, the recorded party's voice is played back at fast speed even if the hold time is long, so the present invention realizes the in-vehicle hands-free apparatus that allows the driver to return to the call soon after the cancel of the hold.

Here, the above-mentioned in-vehicle hands-free apparatus further may comprise a first message generation unit operable to generate, when the action determination unit switches the state of the call from the call state to the hold state, a voice delivery message notifying that the voice of the party uttered during the hold state including a point of time of the switching is delivered to the user; and a sending unit operable to send the voice delivery message to a communication apparatus of the party. As just described, the party can know that what he said is delivered to the driver even if the call is held, so the party does not need to repeat what he said nor confirm that his talk is delivered to the driver when the call is resumed, and thus the driver can return to the call more securely and smoothly.

The present invention can be realized not only as the above-mentioned in-vehicle hands-free apparatus, but also as a hands-free call method including steps executed by characteristic units included in this in-vehicle hands-free apparatus, or as a program for causing a computer to execute these steps. Needless to say, such a program can be distributed via a recording medium such as a CD-ROM or a transmission medium such as the Internet.

As explained above, according to the present invention, the party's voice is always recorded, and even if it is interrupted by the hold of the call, it is played back after the return to the situation in which the hold can be cancelled. Therefore, the driver can return to the call smoothly without losing the incoming voice. That is an effect of the present invention. In addition to this effect, the interrupted conversation does not distract the driver from driving that requires high concentration, but he can concentrate on driving only.

Furthermore, even if the call is held for a long time, the recorded party's voice is played back at fast speed, so the driver can return to the call quickly.

And what is more, when the call is held, the party is informed that what he says is to be delivered to the driver even if the call is held, and thus understands that his talk during the hold is delivered to the driver. Therefore, when the call is resumed, the party does not need to repeat what he said nor confirm that what he said has been delivered to the driver, so it is ensured that the driver can return to the call smoothly.

As further information about technical background to this application, Japanese Patent Application No. 2002-286750 filed on Sep. 30, 2002, is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 3 is a block diagram showing a structure of the in-vehicle hands-free apparatus.

FIG. 4 is a diagram showing an example of an action determination pattern in the in-vehicle hands-free apparatus.

FIG. 9 is a communication sequence of a hands-free call using the in-vehicle hands-free apparatus.

DESCRIPTION OF THE PREFERRED EMBODIMENT(S)

The best mode for carrying out the present invention will be explained in detail below.

First Embodiment

Figure 1:
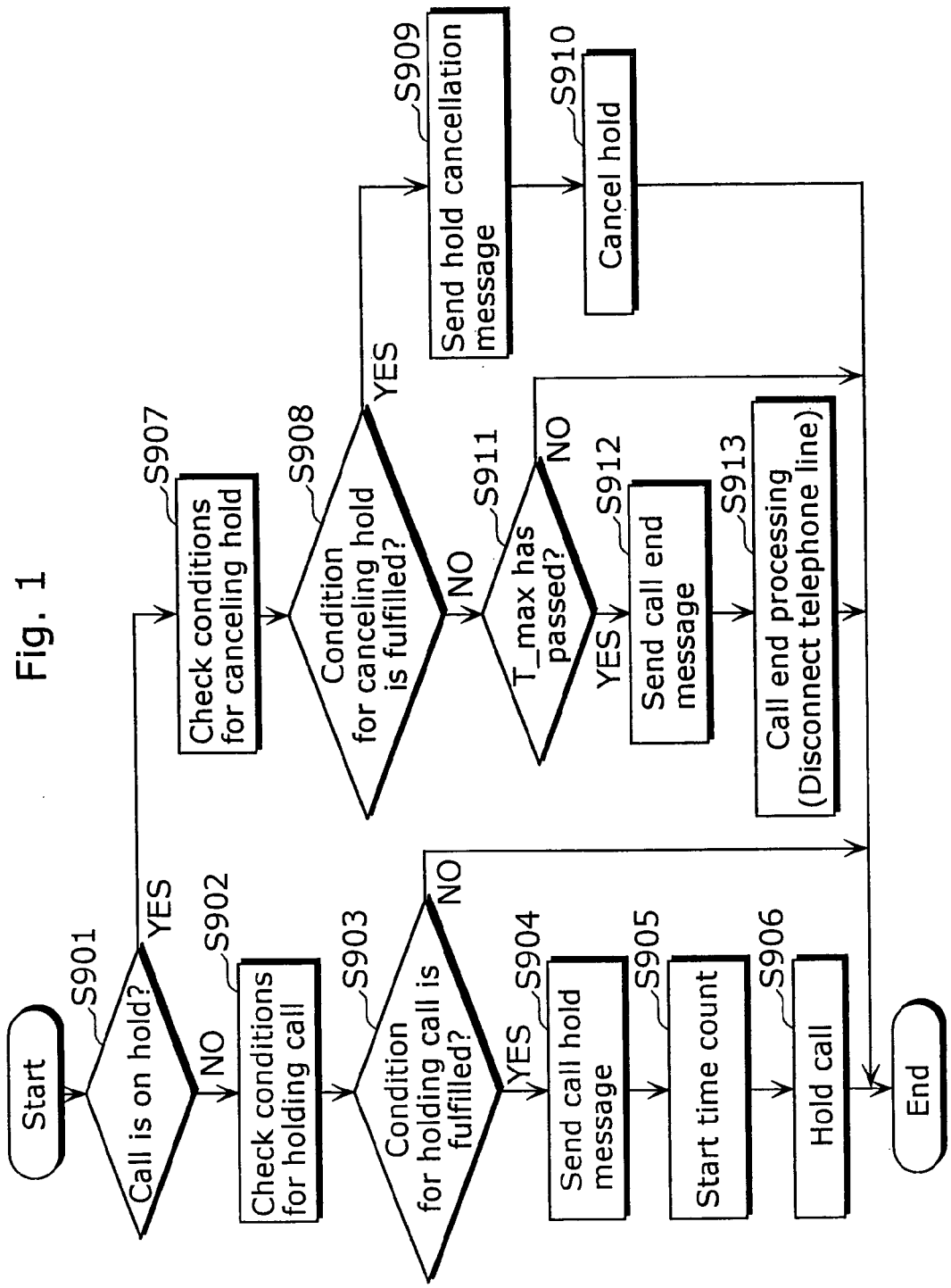
FIG. 1 is a flowchart showing control of a conventional in-vehicle hands-free apparatus.
Figure 2:
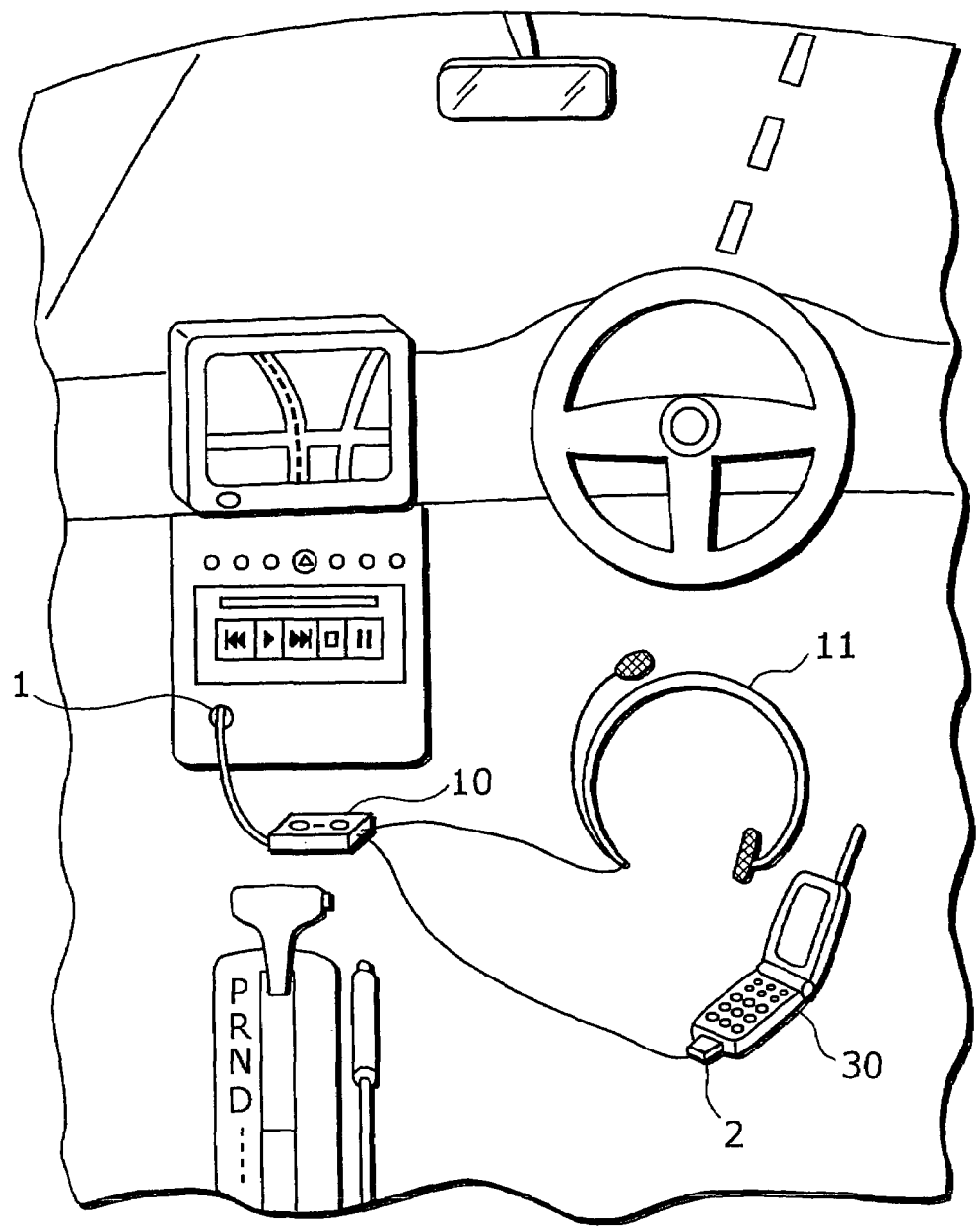
FIG. 2 is an example of an external view of an in-vehicle hands-free apparatus according to a first embodiment of the present invention.

FIG. 2 is an example of an external view of an in-vehicle hands-free apparatus according to a first embodiment of the present invention.

This in-vehicle hands-free apparatus 10 is connected to a car phone equipped in a car or a mobile phone 30 to realize a hands-free call.

As shown in FIG. 2, power is supplied to the in-vehicle hands-free apparatus 10 by plugging a power cable into a cigarette socket 1 mounted on a console unit adjacent to a driver's seat.

The in-vehicle hands-free apparatus 10 is connected to a headset 11 equipped with a microphone and a speaker for a driver's hands-free call, and further connected to the mobile phone 30 via an adaptor 2 plugged into a connector terminal of the mobile phone 30.

The in-vehicle hands-free apparatus 10 and the mobile phone 30 do not always need to be connected in the manner as shown in this figure, but may be connected by a cable via an earphone microphone terminal of the mobile phone 30 or by radio such as Bluetooth®.

FIG. 3 is a functional block diagram showing the structure of the in-vehicle hands-free apparatus 10 according to the first embodiment.

As shown in FIG. 3, the in-vehicle hands-free apparatus 10 includes a situation analysis unit 12 for obtaining information outputted from a group of sensors 20 for detecting surrounding situations and analyzing the surrounding situations; an action determination unit 13 for determining, based on the analysis results of the situation analysis unit 12, an action that the in-vehicle hands-free apparatus 10 should take; a playback control unit 14 for controlling output of a voice signal to a voice output unit 16 based on a control signal outputted from the action determination unit 13; a communication unit 15 via which the in-vehicle hands-free apparatus 10 is connected to the mobile phone 30; the voice output unit 16 for outputting a voice of the party on the other end of the call (hereinafter also referred to as "an incoming voice"); and a storage unit 17 for storing the party's voice.

The sensors 20 are various types of sensors which are mounted in a car for detecting surrounding situations.

Here, the surrounding situations are information on the car positions, car movements, car surrounding situations, and the like. The car movements include left and right-handed turns, backward movement, start, stop, lane change, merge into a main lane, overspeed, hard (sudden) braking, stationary driving and so on. The car surrounding situations include an obstacle, decreased distance between cars, complicated and dangerous terrain, low visibility, noise detection and so on.

In order to detect this information, the group of sensors 20 includes a GPS (Global Positioning System) terminal, a speed sensor, an acceleration sensor, an obstacle sensor, a range sensor, a noise sensor and so on, for example.

Here, as an obstacle sensor and a range sensor, an ultrasonic sensor, an EHF (extremely high frequency) sensor, an infrared sensor, a laser range finder, a picture camera or the like can be used. As a noise sensor, a microphone or the like can be used.

These sensors can be mounted on a car body in advance, or on the main unit of the in-vehicle hands-free apparatus 10. For example, a microphone as a noise sensor may be mounted on a car body, or a microphone for voice input of the in-vehicle hands-free apparatus 10 may also be used as a noise sensor.

As the group of sensors 20, devices such as a blinker, a wiper and a light can be used in addition to the above-mentioned devices.

These various types of sensors that comprise the group of sensors 20 detect the surrounding situations and output the obtained values as sensor output information to the situation analysis unit 12 of the in-vehicle hands-free apparatus 10, respectively.

The situation analysis unit 12 is a processing unit for analyzing a car position, a car movement and a car surrounding situation based on sensor output information outputted from the group of sensors 20, and is realized by a CPU or a memory. This situation analysis unit 12 outputs information obtained as a result of the analysis to the action determination unit 13.

The action determination unit 13 is a processing unit realized by a CPU or a memory, for determining an action that the in-vehicle hands-free apparatus 10 should take, namely, continuing a call, holding a call or canceling a hold, based on the analysis of the car position, car movement and car surrounding situation outputted from the situation analysis unit 12, and outputting a control signal based on the determination to the playback control unit 14. The control signal outputted from the action determination unit 13 to the playback control unit 14 is a signal for giving an instruction to suspend output of an incoming voice signal to the voice output unit 16 when an action to hold the call is determined, an instruction to play back the incoming voice stored in the storage unit 17 when an action to cancel the hold is determined, or the like.

The playback control unit 14 is a processing unit for controlling output of an incoming voice signal to the voice output unit 16 based on a control signal outputted from the action determination unit 13. This playback control unit 14 exercises a normal control of outputting an incoming voice signal sent from the communication unit 15 to the voice output unit 16 as it is during a call; a hold control of suspending output of an incoming voice signal sent from the communication unit 15 when a call is held; a hold cancel control of reading out an incoming voice signal stored in the storage unit 17 to play back and output it when a hold is cancelled; and so on. Here, a "hold" means any one of a temporary stop of both a driver's speech to the party and the party's speech to the driver, a temporary stop of the driver's speech to the party only, or a temporary stop of the party's speech to the driver only.

Here, the playback control unit 14 includes a timer for measuring an elapsed time since a start of a hold. So, it is desirable to structure the playback control unit 14 so as to read out a recorded incoming voice signal from the storage unit 17 for playback after a hold is cancelled, in a case where a hold time (T_hold) is equal to or longer than a predetermined period of time (T_min). Under such a structure, continuity of conversation can be kept by omitting playback and output of the recorded incoming voice when the continuity would be better to be kept, for example, when a hold time (T_hold) is extremely short.

The playback control unit 14 plays back the recorded incoming voice signal at a speed faster than a normal speed (1.5-speed, for example) in a case where a hold time (T_hold) is equal to or longer than a predetermined period of time (T_th). In other words, the playback control unit 14 has a function of controlling the playback speed of the recorded incoming voice signal. So, it is desirable to structure the playback control unit 14 so as to compress or extend the speech to a comfortable speed depending on a predetermined playback speed. Under such a structure, the playback speed of the recorded incoming voice is increased when the hold time (T_hold) is long, and thus a driver can return to the call quickly.

The communication unit 15 is a communication interface for sending and receiving a voice signal from a driver or an incoming voice signal from the party to and from the mobile phone 30, and it outputs the received incoming voice signal to the playback control unit 14 and stores it in the storage unit 17 in sequence. Under the control of the playback control unit 14, this communication unit 15 can compress or extend the incoming voice signal depending on its time length to store it in the storage unit 17.

The voice output unit 16 is a speaker for converting an incoming voice signal outputted from the playback control unit 14 during a call and a recorded incoming voice signal outputted when a call hold is cancelled, respectively, into voice for output. It can be realized by a speaker of the headset 11 as shown in FIG. 2, for example. It can also be realized by a speaker for outputting sound from audio equipment mounted in a car.

The storage unit 17 is a storage device such as a memory and a hard disk for storing an incoming voice signal outputted from the communication unit 15, and it holds a recorded incoming voice signal which is digitized by PCM (Pulse Code Modulation) or the like.

Operations of the in-vehicle hands-free apparatus 10 structured as described above will be explained below.

First, an example pattern of the operations executed by the group of sensors 20, the situation analysis unit 12 and the action determination unit 13 for detecting surrounding situations, analyzing the information on the situations and determining an action of the in-vehicle hands-free apparatus 10, respectively, will be explained.

FIG. 4 is a diagram showing an example of an action determination pattern in the in-vehicle hands-free apparatus 10.

As mentioned above, the action of the in-vehicle hands-free apparatus 10 determined by the action determination unit 13 is any one of the following three: holding a call, continuing a call and canceling a hold.

Situations to hold a call can be classified broadly into a situation where a driver's viewpoint moves excessively, a situation where a driver can hardly grasp his surrounding situation, a situation where a driver can hardly listen to a voice, a situation which a driver judges to be dangerous, and a situation where an accident has occurred.

Situations to continue a call and cancel a hold are situations where it is judged to be safe.

How to determine the action will be described specifically below.

For example, when the car speed sensor detects a car speed in the blinker ON state, the situation analysis unit 12 judges that the car is to turn to the right or left, merge into a main lane or change a lane. When the gear is shifted to reverse, the situation analysis unit 12 judges that the car is to move backward. When the obstacle sensor or the range sensor detects an obstacle ahead or behind of the car in the blinker ON state, the situation analysis unit 12 judges that the car is to start from the road shoulder, stop at the road shoulder, merge into a main lane or change a lane. When the obstacle sensor or the range sensor detects an obstacle within a predetermined range from the car, the situation analysis unit 12 judges that there is an obstacle near the car.

These four situations are all situations where the driver's viewpoint moves here and there. So, when the sensors detect these situations, the situation analysis unit 12 considers it as a situation where a driver's viewpoint moves excessively and outputs the judgment to the action determination unit 13, while the action determination unit 13 holds the call.

When the range sensor detects that another car exists within a predetermined range ahead or behind of a car, the situation analysis unit 12 judges that the distance between the cars is short. When the GPS terminal detects a running location of a car and then detects that the running location is in a dangerous terrain as a result of comparison between the running location and map data in which dangerous terrain information indicating dangerous location information is stored in advance or as a result of calculation of a curvature of a road in the direction in which the car is headed, the situation analysis unit 12 judges that the car is running in a complicated and dangerous terrain. When it is detected that a wiper moves in full swing and a light is turned on, the situation analysis unit 12 judges that a driver's visibility is low due to rain, fog or the like. When the car speed sensor and the ETC (Electronic Toll Collection System) terminal detect that a running speed of a car exceeds a speed limit of a road significantly, the situation analysis unit 12 judges to be overspeed. Note that the ETC terminal is used for judging whether the car is running on an open road or an expressway. A running location of a car may be detected using not only the car speed sensor and the ETC terminal but also the GPS terminal so as to detect overspeed based on the present running location, running speed and map data in which legal speed information indicating a legal speed of each road is stored in advance.

These four situations are all situations where a driver's visibility becomes narrow. So, when the sensors and the like detect these situations, the situation analysis unit 12 considers them as situations where a driver can hardly grasp his surrounding situation and outputs the judgment to the action determination unit 13, while the action determination unit 13 holds a call.

When the noise sensor detects a noise of a predetermined level or higher, the situation analysis unit 12 judges to be noise detection. This situation is a situation where a driver can hardly listen to an incoming voice due to noise. So, upon detecting this situation, the situation analysis unit 12 considers it as a situation where a driver can hardly listen to a voice and outputs the judgment to the action determination unit 13, while the action determination unit 13 holds a call.

When the acceleration sensor detects a sudden slowdown or it is detected that a horn is ON or a push-button switch provided on the in-vehicle hands-free apparatus 10 is ON, the situation analysis unit 12 judges that a driver has detected danger. These situations are situations where the driver brakes hard or blows the horn. So, upon detecting these situations, the situation analysis unit 12 considers them as situations dangerous for the driver and outputs the judgment to the action determination unit 13, while the action determination unit 13 holds a call.

When it is detected that an emergency notification apparatus for notifying a driver's emergency situation (HELP) or an airbag, provided in a car, is activated, the situation analysis unit 12 judges that an accident has occurred. This situation is a situation where a car is in an emergency. So, upon detecting this situation, the situation analysis unit 12 considers it as a situation where an accident has occurred and outputs the judgment to the action determination unit 13, while the action determination unit 13 holds a call. Note that the emergency notification apparatus is an apparatus which is activated by a driver himself, an apparatus which is activated automatically in conjunction with an airbag or the like, and so on.

On the other hand, when a condition exclusive of the conditions for holding a call is fulfilled, namely, the above-mentioned situations are not detected, the situation analysis unit 12 judges to be a non-dangerous situation. In this case, if the in-vehicle hands-free apparatus 10 is in the action of a call hold, the situation analysis unit 12 considers it to be a safe situation where a driver can resume a call and outputs the judgment to the action determination unit 13, while the action determination unit 13 cancels the hold. If the in-vehicle hands-free apparatus 10 is in the action of a continuation of a call, the situation analysis unit 12 does not output the judgment to the action determination unit 13, while the action determination unit 13 continues a call.

Next, a flow of operations of the in-vehicle hands-free apparatus 10, from a call start until a call end in a case where the call is held, will be explained.

Figure 5:
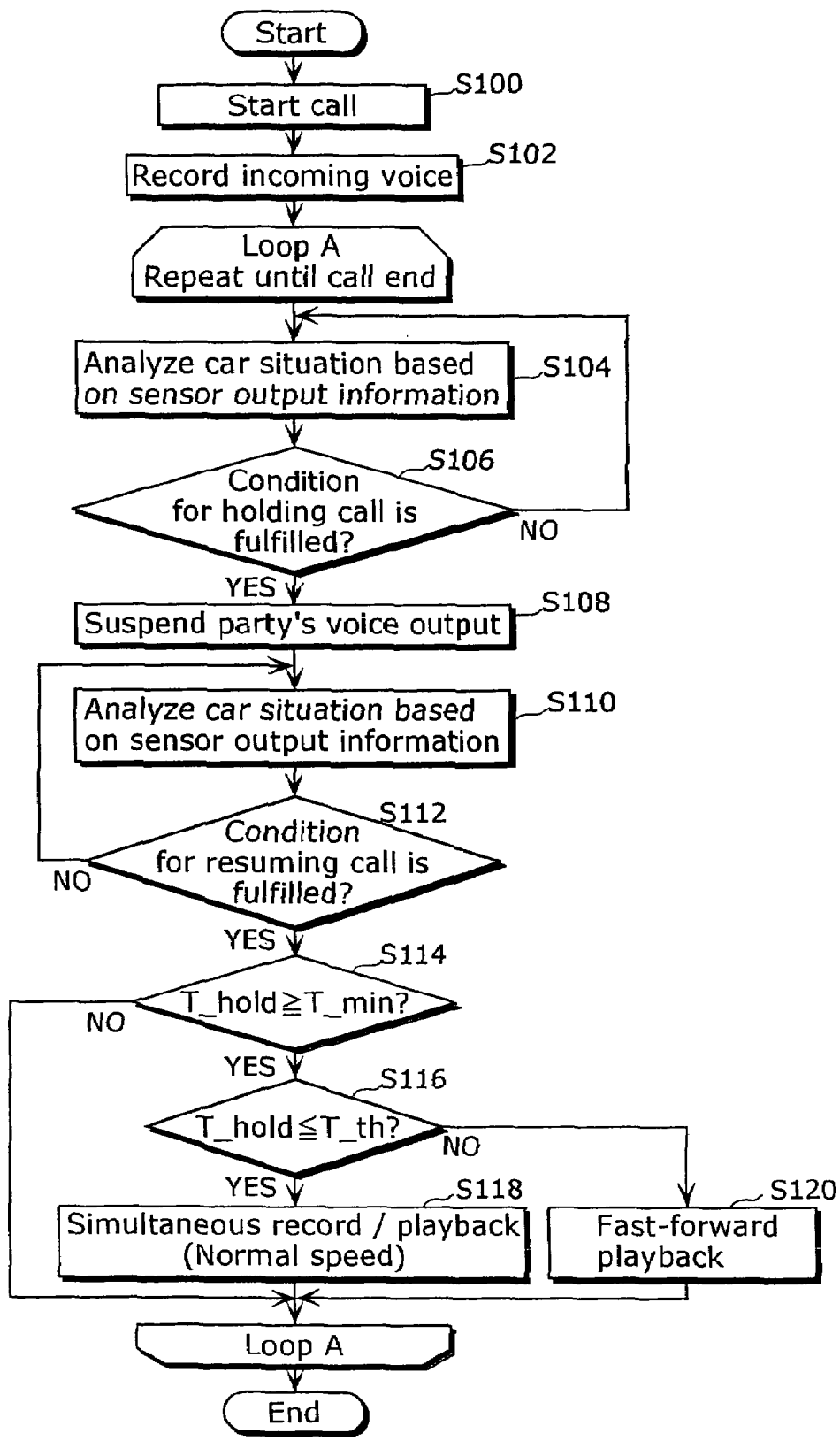
FIG. 5 is a flowchart showing control of the in-vehicle hands-free apparatus.

FIG. 5 is a flowchart showing control of the in-vehicle hands-free apparatus 10.

First, a hands-free call starts (S100), the in-vehicle hands-free apparatus 10 starts recording of an incoming voice and continues recording the incoming voice signal in the storage unit 17 all the way during the call (S102).

Next, in the in-vehicle hands-free apparatus 10, the situation analysis unit 12 monitors surrounding situations of a car using sensor output information from the group of sensors 20 (S104), and judges whether a condition for holding a call is fulfilled or not (S106).

If the condition for holding a call is not fulfilled (NO in S106), the in-vehicle hands-free apparatus 10 returns to Step S104, while if the condition is fulfilled (YES in S106), in the in-vehicle hands-free apparatus 10, the action determination unit 13 outputs a control signal instructing the playback control unit 14 to suspend output of the incoming voice signal to the voice output unit 16 so as to have the playback control unit 14 stop outputting the incoming voice signal to the voice output unit 16, and thus holds the call (S108).

Then, in the in-vehicle hands-free apparatus 10, the situation analysis unit 12 monitors the surrounding situations of the car using the sensor output information from the group of sensors 20 (S110), and judges whether the condition exclusive of the conditions for holding the call, namely, the condition for resuming the call is fulfilled or not (S112).

If the condition for resuming the call is not fulfilled (NO in Step S112), the in-vehicle hands-free apparatus 10 returns to Step S110, while if the condition is fulfilled (YES in S112), in the in-vehicle hands-free apparatus 10, the action determination unit 13 outputs a control signal for canceling the hold to the playback control unit 14.

Then, the playback control unit 14 judges whether or not a hold time (a period of time which has elapsed since the start of the hold) (T_hold) measured by a timer is longer than a predetermined period of time (T_min) (S114). Note that this predetermined period of time (T_min) is 3~4 seconds or so, for example.

If the hold time (T_hold) is equal to or longer than the predetermined period of time (T_min) (YES in S114), in the in-vehicle hands-free apparatus 10, the playback control unit 14 further judges whether or not the hold time (T_hold) is shorter than a predetermined period of time (T_th) (S116). Note that this predetermined period of time (T_th) is 10 seconds or so, in particular.

If the hold time (T_hold) is equal to or shorter than the predetermined period of time (T_th) (YES in S116), in the in-vehicle hands-free apparatus 10, the playback control unit 14 reads out the recorded incoming voice signal from the storage unit 17 based on the control signal for canceling the hold outputted from the action determination unit 13, plays it back while recording, namely, plays it back at normal speed while recording (simultaneous record/playback) (S118), and then resumes the call.

On the contrary, if the hold time (T_hold) is longer than the predetermined period of time (T_th) (NO in S116), the playback control unit 14 reads out the recorded incoming voice signal from the storage unit 17 based on the control signal for canceling the hold outputted from the action determination unit 13, plays it back at fast speed (fast-forward playback) (S120), and then resumes the call.

On the other hand, if the hold time (T_hold) is shorter than the predetermined period of time (T_min) (NO in S114), the in-vehicle hands-free apparatus 10 resets the control signal for canceling the hold outputted from the action determination unit 13, and resumes the call.

After resuming the call, the in-vehicle hands-free apparatus 10 repeats the operations in Step S104~Step S120 until the end of the call (Loop A).

A hands-free call using the in-vehicle hands-free apparatus 10 that operates along the above-mentioned flow will be explained in more detail with reference to FIG. 6. Here, it is assumed that a communication apparatus of the party is a mobile phone.

Figure 6:
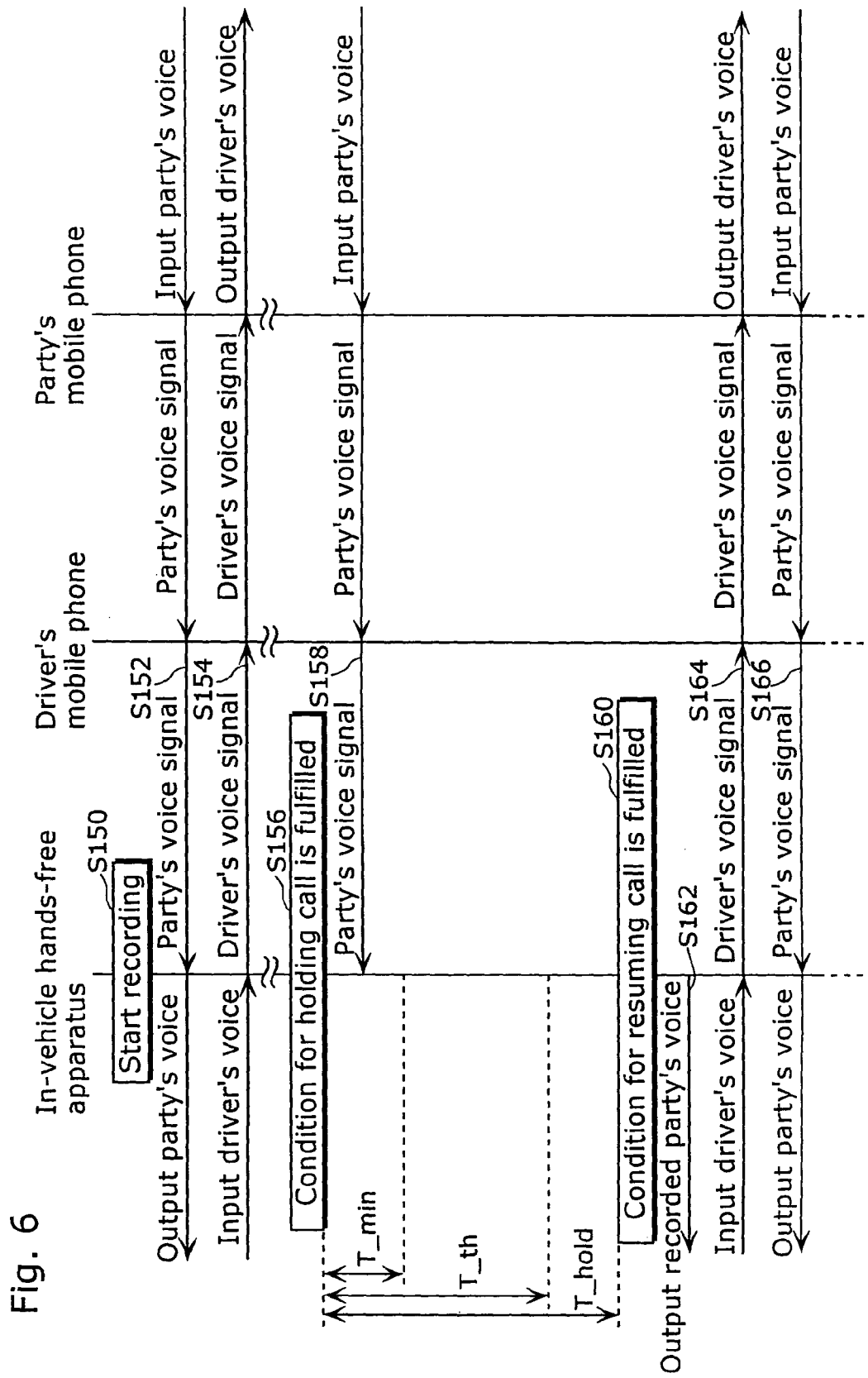
FIG. 6 is a communication sequence of a hands-free call using the in-vehicle hands-free apparatus.

FIG. 6 is a communication sequence of a hands-free call using the in-vehicle hands-free apparatus.

As shown in FIG. 6, a hands-free call is made between the in-vehicle hands-free apparatus 10, a driver's mobile phone connected to the in-vehicle hands-free apparatus 10, and a party's mobile phone.

As mentioned above, the in-vehicle hands-free apparatus 10 starts recording the voice of the party when a hands-free call is started (S150).

Then, the party's mobile phone accepts an input of the party's voice and sends the voice signal thereof to the driver's mobile phone, and the in-vehicle hands-free apparatus 10 receives the voice signal from the driver's mobile phone and outputs the party's voice (S152).

In the same manner, the in-vehicle hands-free apparatus 10 accepts an input of the driver's voice and sends the voice signal thereof to the driver's mobile phone, and the party's mobile phone receives the voice signal from the driver's mobile phone and outputs the driver's voice (S154).

Under the normal situation, a hands-free call is made in the manner as mentioned above.

When the condition for holding the call is fulfilled (S156), the in-vehicle hands-free apparatus 10 receives the party's voice signal and records it (S158), and waits until the condition for resuming the call is fulfilled while measuring a hold time (T_hold) using a timer, without outputting the party's voice.

When the condition for resuming the call is fulfilled (S160), the in-vehicle hands-free apparatus 10 judges the measured hold time (T_hold) in the manner as mentioned above, and determines whether to output the recorded party's voice or not, and if it outputs, it determines whether to play back the voice at normal speed while recording (simultaneous record/playback) or plays it back at fast speed (fast-forward playback).

In this figure, the hold time (T_hold) is longer than a predetermined period of time (T_min) that is a threshold for outputting the recorded party's voice and longer than another predetermined period of time (T_th) that is a threshold between simultaneous record/playback and fast-forward playback, so the in-vehicle hands-free apparatus 10 outputs the recorded party's voice in fast-forward playback mode (S162).

Here, the playback of the recorded party's voice (regardless of simultaneous record/playback or fast-forward playback) is started at the time point of suspending output of the incoming party's voice, namely, at the time point of starting the hold, or more preferably, prior to the start of the hold. To be more specific, the time point prior to the start of the hold means a time point preceding the start of the hold for a predetermined period of time (2~3 seconds, for example). By detecting a silent interval with a predetermined or lower level of sound pressure from a voice signal at the time point of starting the hold or the time point just before the start of the hold, the playback of the party's voice may be started at a break between syllables where the silent interval continues for a predetermined period of time or longer. As described above, by starting playback of the recorded party's voice at a time point preceding the start of the hold for a few seconds or a break between syllables just before the start of the hold, the party's voice which has not been outputted due to the hold can be transmitted to the driver. Therefore, the driver can return to the call smoothly without losing what the party said during the hold.

Then, after finishing output of the recorded party's voice, the in-vehicle hands-free apparatus 10 accepts an input of the driver's voice and sends the voice signal to the driver's mobile phone, and the party's mobile phone receives the voice signal from the driver's mobile phone and outputs the driver's voice (S164), and then the party's mobile phone accepts an input of the party's voice and sends the voice signal to the driver's mobile phone, and the in-vehicle hands-free apparatus 10 receives the voice signal from the driver's mobile phone and outputs the party's voice (S166), and thus the hands-free call is resumed under the normal situations.

As described above, even if a call is held in the middle of the party's talk due to a situation of a driver or a car, the in-vehicle hands-free apparatus 10 according to the first embodiment always records the party's voice from the start of the call and plays back the recorded voice when the hold is cancelled, so the driver can know what the party said before and during the hold and thus can return to the call smoothly. The driver can also concentrate on driving because the party's talk interrupted due to the shift to the hold does not distract the driver.

In addition, even if the hold time becomes long, the recorded party's voice is played back at fast speed, so the driver can also return to the call quickly.

Second Embodiment

Next, an in-vehicle hands-free apparatus according to the second embodiment of the present invention will be explained.

The in-vehicle hands-free apparatus in the second embodiment is almost same as the in-vehicle hands-free apparatus 10 in the first embodiment in structure, but different in that the former has a function of generating messages for a driver and his party of a call. The in-vehicle hands-free apparatus of the second embodiment will be explained with particular emphasis on this different point. Note that the same reference numbers are assigned to the same components as those in the first embodiment, and the explanation thereof is omitted.

Figure 7:
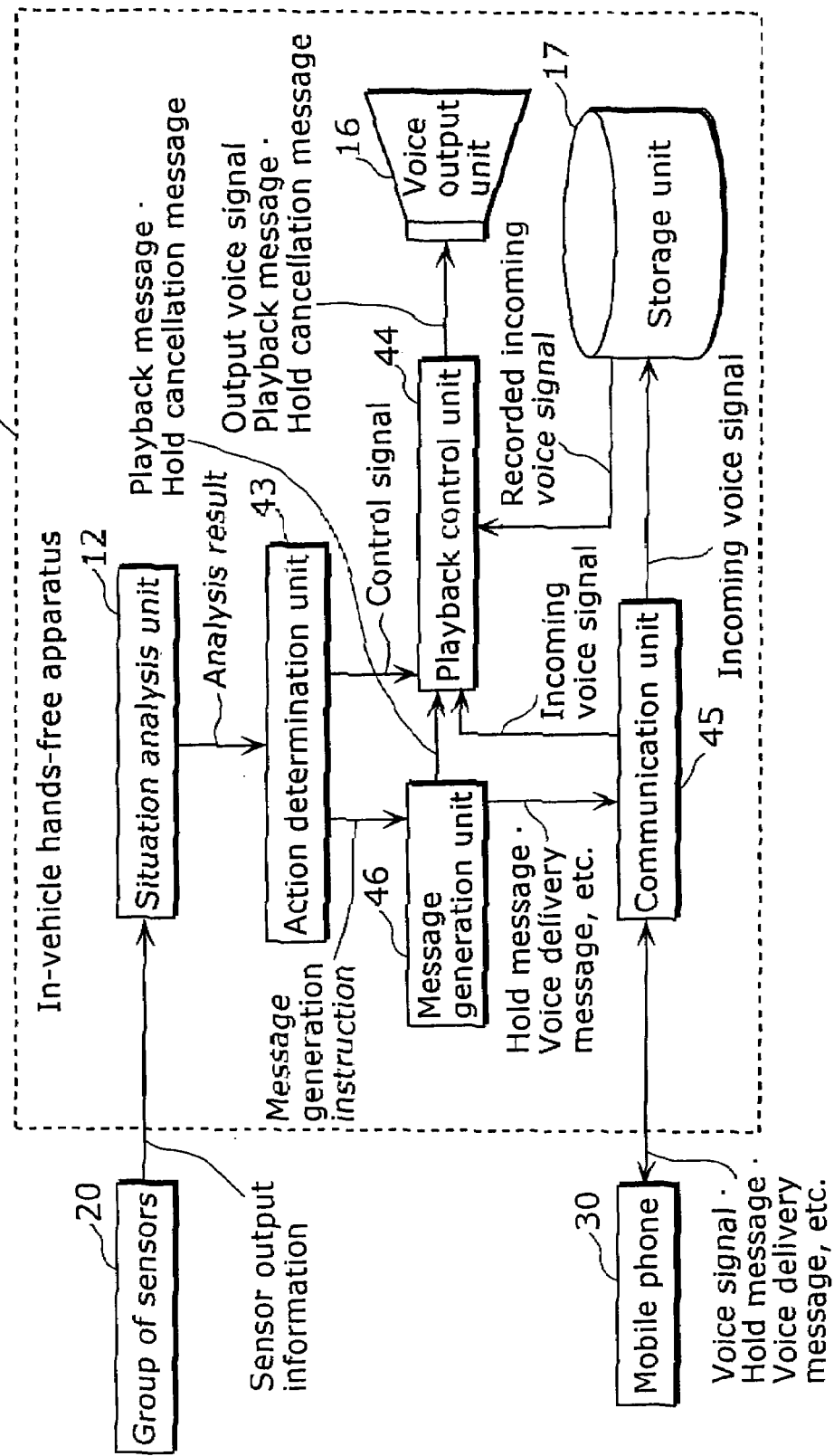
FIG. 7 is a block diagram showing a structure of an in-vehicle hands-free apparatus according to a second embodiment of the present invention.

FIG. 7 is a block diagram showing the structure of the in-vehicle hands-free apparatus according to the second embodiment of the present invention.

As shown in FIG. 7, this in-vehicle hands-free apparatus 40 is different from the in-vehicle hands-free apparatus 10 in the first embodiment in that the in-vehicle hands-free apparatus 40 of the second embodiment includes a message generation unit 46 in addition to the components of the first embodiment and the includes an action determination unit 43, a playback control unit 44 and a communication unit 45 that have functional differences from the action determination unit 13, the playback control unit 14 and the communication unit 15 of the first embodiment.

The message generation unit 46 is a processing unit for generating voice messages for a driver and his party based on a control signal outputted from the action determination unit 43, and outputs the generated messages to the playback control unit 44 or the communication unit 45.

Here, the messages generated by the message generation unit 46 include a hold message notifying the party that a call has been held, such as "the call has been held," and a voice delivery message notifying the party that his talk before and during the hold is delivered to the driver, such as "your voice during the hold is delivered to the driver." The messages also include a playback message notifying the driver of the start of the playback of the recorded incoming voice when the playback of the recorded incoming voice is started, such as "the party's voice recorded during the hold will be played back," and a hold cancellation message notifying both the driver and the party of the cancellation of the hold, such as "the hold has been cancelled."

The action determination unit 43 determines actions that the in-vehicle hands-free apparatus 40 should take, and outputs a control signal to the message generation unit 46 and the playback control unit 44 based on the determination. The control signal which is outputted to the message generation unit 46 from the action determination unit 43 at this time is a signal for giving an instruction to generate the hold message and the voice delivery message when an action to hold a call is determined, an instruction to generate the playback message and the hold cancellation message when an action to cancel the hold is determined, or the like. The control signal which is outputted to the playback control unit 44 from the action determination unit 43 is a signal for giving an instruction to play back the playback message and the hold cancellation message when an action to cancel the hold is determined, or the like.

Here, the action determination unit 43 includes, like the playback control unit 44, a timer for measuring a period of time which has elapsed since a call was held, and it is desirable to structure this action determination unit 43 so as to output an instruction to generate the hold message and the voice delivery message in a case where the hold time (T_hold) is equal to or longer than a predetermined period of time (T_wait) and to output an instruction to generate the playback message and the hold cancellation message in a case where the hold time is equal to or longer than a predetermined period of time (T_min). Under such a structure, it can keep continuity of conversation by omitting output of the hold message or the like when the hold time (T_hold) is very short.

The playback control unit 44 outputs, based on the control signal outputted from the action determination unit 43, the playback message to the voice output unit 16 before the recorded incoming voice signal is read out and played back, and the hold cancellation message to the voice output unit 16 immediately after the recorded incoming voice signal is read out and played back, respectively.

The communication unit 45 sends the hold message, voice delivery message and hold cancellation message generated by the message generation unit 46 to the party's communication apparatus via a mobile phone 30 and a communication network connected with the mobile phone 30 by radio.

A flow of operations of the in-vehicle hands-free apparatus 40, from a call start until a call end in a case where a call is held, will be explained.

Figure 8:
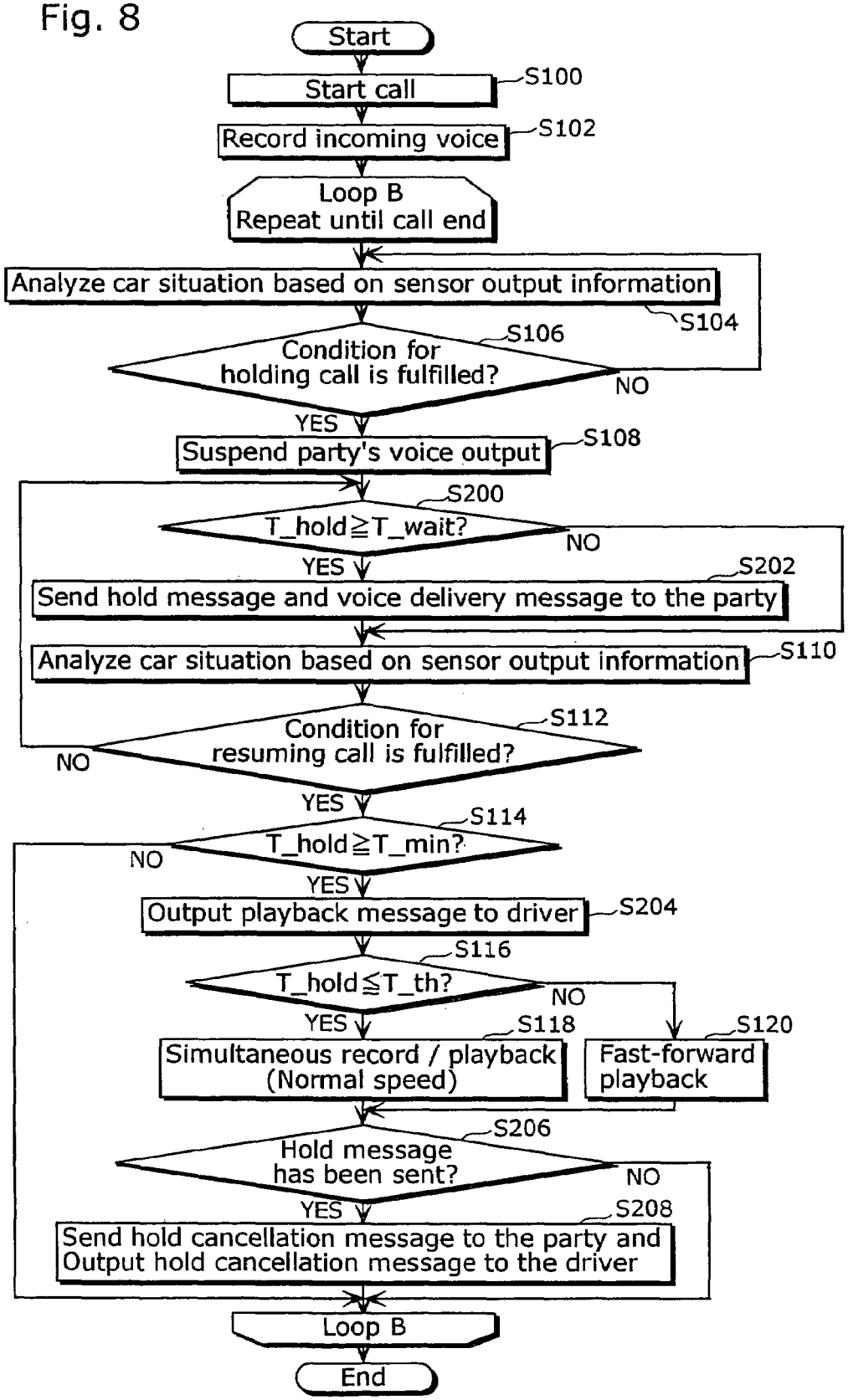
FIG. 8 is a flowchart showing control of the in-vehicle hands-free apparatus.

FIG. 8 is a flowchart showing control of the in-vehicle hands-free apparatus 40. Note that the same reference numbers are assigned to the steps same as those in the control flowchart (FIG. 5) of the first embodiment, and the explanation thereof is omitted.

First, in the in-vehicle hands-free apparatus 40, the playback control unit 44 suspends output of an incoming voice signal to the voice output unit 16 and holds a call (S108), and then the action determination unit 43 judges whether or not a hold time (a time which has elapsed since the call was held) measured by the timer is longer than a predetermined period of time (T_wait) (S200). Note that this predetermined period of time (T_wait) is 2~3 seconds, for example.

If the hold time (T_hold) is equal to or longer than the predetermined period of time (T_wait) (YES in S200), in the in-vehicle hands-free apparatus 40, the action determination unit 43 outputs a control signal instructing the message generation unit 46 to generate a hold message and a voice delivery message, and the communication unit 45 sends the hold message and the voice delivery message generated by the message generation unit 46 to the party (S202).

On the other hand, if the hold time (T_hold) is shorter than the predetermined period of time (T_wait) (NO in S200), the in-vehicle hands-free apparatus 40 goes to Step S110.

Then, in the in-vehicle hands-free apparatus 40, the situation analysis unit 12 judges that the condition for resuming the call is fulfilled (YES in S112), and when the action determination unit 43 judges that the hold time (T_hold) measured by the timer is equal to or longer than a predetermined period of time (T_min) (YES in S114), it outputs a control signal instructing the message generation unit 46 to generate a playback message and then outputs a control signal instructing the playback control unit 44 to play back the playback message generated by the message generation unit 46. And the playback control unit 44 outputs the playback message obtained from the message generation unit 46 for the driver from the voice output unit 16 (S204).

Further, in the in-vehicle hands-free apparatus 40, after the playback control unit 44 plays back the recorded incoming voice at normal speed while recording (simultaneous record/playback) (S118) or at fast speed (fast-forward playback) (S120), the action determination unit 43 judges whether or not the hold message has been sent to the party in Step S202 (S206).

Here, if the hold message has been sent to the party (YES in S206), in the in-vehicle hands-free apparatus 40, the action determination unit 43 outputs a control signal instructing the message generation unit 46 to generate a hold cancellation message, and the communication unit 45 sends the hold cancellation message generated by the message generation unit 46 to the party (S208). Further, in the in-vehicle hands-free apparatus 40, the action determination unit 43 outputs a control signal instructing the playback control unit 44 to play back the hold cancellation message generated by the message generation unit 46, and the playback control unit 44 outputs the hold cancellation message obtained from the message generation unit 46 for the driver from the voice output unit 16 (S208). After that, the in-vehicle hands-free apparatus 40 resumes the call.

On the other hand, if the hold message has not yet been sent to the party (NO in S206), the in-vehicle hands-free apparatus 40 resumes the call without outputting the hold cancellation message.

After resuming the call, the in-vehicle hands-free apparatus 40 repeats the operations in Step S104~Step S208 until the end of the call (Loop B).

A hands-free call using the in-vehicle hands-free apparatus 40 that operates along the above-mentioned flow will be explained in more detail with reference to FIG. 9. Here, it is assumed that the communication apparatus of the party is a mobile phone, as is the case with the first embodiment.

FIG. 9 is a communication sequence of a hands-free call using the in-vehicle hands-free apparatus 40. Note that the same reference numbers are assigned to the steps same as those as shown in the communication sequence (FIG. 6) in the above first embodiment, and the explanation thereof is omitted.

First, after the condition for holding a call is fulfilled (S156) and the in-vehicle hands-free apparatus 40 receives a voice signal of the party and records it (S158), it does not output the party's voice, but measures a hold time (T_hold) (a time period which has elapsed since the call was held) using the timer until the condition for resuming the call is fulfilled.

In a case where the measured hold time (T_hold) is equal to or longer than a predetermined period of time (T_wait) that is a threshold of sending a hold message and a voice delivery message, the in-vehicle hands-free apparatus 40 generates the hold message and the voice delivery message (S250), and sends the voice signals of the hold message and the voice delivery message to the party's mobile phone (S252). At this time, by means of the voices of the hold message and voice delivery message outputted from the party's mobile phone, the party can know that the call has been held and what he said, namely, his voice recorded in Step S158 is to be delivered to the driver. In FIG. 9, the voice signals of the hold message and the voice delivery message are sent once, but the in-vehicle hands-free apparatus 40 may repeat sending of the voice signals of the hold message and the voice delivery message until the condition for resuming the call is fulfilled.

Next, in a case where the condition for resuming the call is fulfilled (S160) and the measured hold time (T_hold) is equal to or longer than a predetermined period of time (T_min) that is a threshold of outputting the recorded party's voice, the in-vehicle hands-free apparatus 40 generates the playback message (S254) and outputs the voice of the playback message for the driver (S256). Therefore, the driver can know that the party's voice which has been recorded during the hold will be played back.

Then, after outputting the recorded party's voice (S162), the in-vehicle hands-free apparatus 40 generates the hold cancellation message (S258) and outputs the voice of the hold cancellation message for the driver (S260), and sends the voice signal of the hold cancellation message to the party's mobile phone (S262). At this time, both the driver and the party can know that the hold has been cancelled and the call is to be resumed, by means of the voice of the hold cancellation message outputted from the in-vehicle hands-free apparatus 40 and the party's mobile phone, respectively.

After that, the party's mobile phone accepts an input of the party's voice and sends the voice signal thereof to the driver's mobile phone, and the in-vehicle hands-free apparatus 40 receives the voice signal from the driver's mobile phone and outputs the party's voice (S264). The in-vehicle hands-free apparatus 40 accepts an input of the driver's voice and sends the voice signal thereof to the driver's mobile phone, and the party's mobile phone receives the voice signal from the driver's mobile phone and outputs the driver's voice (S266), and thus the hands-free call is resumed under the normal situations.

As described above, even if a call is held, the in-vehicle hands-free apparatus 40 according to the second embodiment sends to the communication apparatus on the party's side a message notifying that the call has been held and a message notifying that what the party's said during the hold is to be delivered to the driver. Therefore, the party can know that what he said during the hold is to be delivered to the driver, and thus, when the call is resumed, he does not need to repeat what he said or confirm that what he said has been delivered to the driver.

Also, before resuming the call under the situation where the call can be resumed, the in-vehicle hands-free apparatus 40 outputs for the driver a message notifying that the recorded party's voice is to be played back. Therefore, the driver can know that the playback of the party' voice uttered during the hold or interrupted at the time when the call is held will start.

The in-vehicle hands-free apparatus according to each of the embodiments of the present invention has been explained, but the present invention is not limited to the above embodiments.

For example, the in-vehicle hands-free apparatus is an independent apparatus in each of the above embodiments, but it can be realized by integrating the functional structure of this in-vehicle hands-free car apparatus into a car navigation apparatus or another apparatus provided in a car.

The storage unit 17 for recording an incoming voice is represented as one storage unit in each of the above embodiments, but the storage unit 17 may be comprised of a plurality of storage apparatuses so as to switch them into a storage apparatus applicable to recording of the incoming voice. For that purpose, the storage apparatuses are switched so that the sections of the recorded incoming voice are partly overlapped in each storage apparatus, in order to prevent the interruption of the voice. And, the storage apparatuses are structured so that the incoming voice is erased in the order in which the sections of the voice are recorded after a predetermined period of time has passed without any situation for holding the call being occurred. A plurality of storage apparatuses that make up the storage unit 17 as mentioned above allow constant recording of an incoming voice, even if each storage apparatus has small capacity.

Furthermore, the values of the predetermined periods of time (T_hold, T_min, T_th and T_wait) that have been explained in each of the above embodiments may be fixed values programmed into the in-vehicle hands-free apparatus, or values specified and inputted by a driver, namely, a user of the in-vehicle hands-free apparatus.

In each of the above embodiments, the recorded incoming voice is played back at fast speed in a case where the hold time (T_hold) is longer than a predetermined period of time (T_th), but it may always be played back at fast speed.

In the second embodiment, the message generation unit 46 generates each message for the in-vehicle hands-free apparatus 40 to outputs it for a driver or send it to a communication apparatus on the party's side, but voice data stored in a storage apparatus such as a ROM (Read Only Memory), a RAM (Random Access Memory) and a hard disk or a recording medium such as a CD-ROM may be read out as a message.

Furthermore, in the second embodiment, each message is a voice message, but it may be a character representation of the message on a display of the communication apparatus on the party's side, or a combination of such a character representation and a voice.

INDUSTRIAL APPLICABILITY

The in-vehicle hands-free apparatus according to the present invention has an effect of allowing a driver to concentrate on driving without being distracted with a call and further allowing him to return to the call smoothly and quickly soon after the hold of the call is cancelled without losing what the party of the call said during the hold. Therefore, the in-vehicle hands-free apparatus according to the present invention is useful as a hands-free call apparatus that allows a call without holding a car phone equipped in a car or a mobile phone, and applicable to playback of a radio voice or the like.

What is claimed is:

1. An in-vehicle hands-free apparatus for making a hands-free call using a telephone, the hands-free call being a telephone communication between a user of the in-vehicle hands-free apparatus at one end of the telephone communication and a party on another end of the telephone communication, said in-vehicle hands-free apparatus comprising:

a storage unit operable to store a voice of the party on the other end of the telephone communication between the user and the party uttered during the telephone communication between the user and the party;

a situation analysis unit operable to analyze a surrounding situation of the vehicle based on information outputted from at least one sensor for detecting the surrounding situation;

an action determination unit operable to switch a state of the call between a user of the telephone and the party by selecting either a call state in which output of the voice of the party on the other end of the telephone communication is enabled or a hold state in which the output of the voice of the party on the other end of the telephone communication is suspended, based on a result of the analysis of the situation analysis unit; and a playback output unit operable, when the action determination unit switches the state of the call from the hold state to the call state after switching from the call state to the hold state, to: (a) continue suspending the output of the voice of the party on the other end of the telephone communication and play back the voice of the party that was stored in the storage unit after the state of the call was switched to the hold state by the action determination unit; and (b) thereafter enable the output of the voice of the party on the other end of the telephone communication for the user.

2. The in-vehicle hands-free apparatus according to claim 1, wherein the playback output unit is further operable to play back the voice of the party stored in the storage unit, starting from a section of said voice stored at a point of time before the action determination unit switches the state of the call from the call state to the hold state.

3. The in-vehicle hands-free apparatus according to claim 2, wherein the playback output unit is operable to play back the voice of the party stored in the storage unit, starting from a break of syllables in said voice.

4. The in-vehicle hands-free apparatus according to claim 1, wherein the playback output unit includes:

a hold time measurement unit operable to measure a hold time from a point of time when the action determination unit switches the state of the call from the call state to the hold state until a point of time when the action determination unit switches the state of the call from the hold state to the call state; and a playback control unit operable to determine not to play back the voice of the party stored in the storage unit in a case where the hold time measured by the hold time measurement unit is shorter than a predetermined threshold.

5. The in-vehicle hands-free apparatus according to claim 1, wherein the playback output unit includes a playback speed control unit operable to control a playback speed of the voice of the party stored in the storage unit.

6. The in-vehicle hands-free apparatus according to claim 5, wherein the playback output unit further includes an elapsed time measurement unit operable to measure a time which has elapsed since the action determination unit switched the state of the call from the call state to the hold state, and the playback speed control unit is operable to play back the voice of the party stored in the storage unit at a speed faster than a normal speed in a case where the elapsed time measured by the elapsed time measurement unit is equal to or longer than a predetermined threshold.

7. The in-vehicle hands-free apparatus according to claim 1, further comprising:

a first message generation unit operable to generate, when the action determination unit switches the state of the call from the call state to the hold state, a voice delivery message notifying that the voice of the party uttered during the hold state including a point of time of the switching is delivered to the user; and a sending unit operable to send the voice delivery message to a communication apparatus of the party.

8. The in-vehicle hands-free apparatus according to claim 7, wherein the first message generation unit is further operable to generate a hold message notifying that the action determination unit has switched the state of the call from the call state to the hold state and a hold cancellation message notifying that the action determination unit has switched the state of the call from the hold state to the call state, and the sending unit is operable to send the hold message to the communication apparatus of the party the instant that the action determination unit has switched the state of the call from the call state to the hold state, and to send the hold cancellation message to the communication apparatus of the party the instant that the action determination unit has switched the state of the call from the hold state to the call state.

9. The in-vehicle hands-free apparatus according to claim 8, wherein the sending unit is operable to send the voice delivery message and the hold message to the communication apparatus of the party repeatedly until the playback output unit ends the playback of the voice of the party stored in the storage unit.

10. The in-vehicle hands-free apparatus according to claim 1, further comprising a second message generation unit operable to generate a playback message notifying that the playback of the voice of the party stored in the storage unit is to be started, wherein the playback output unit is operable to play back the playback message and output said playback message for the user before starting the playback of said voice.

11. The in-vehicle hands-free apparatus according to claim 10, wherein the second message generation unit is further operable to generate a hold message notifying that the action determination unit has switched the state of the call from the call state to the hold state and a hold cancellation message notifying that the action determination unit has switched the state of the call from the hold state to the call state, and the playback output unit is operable to output the hold message for the user the instant that the action determination unit has switched the state of the call from the call state to the hold state, and to output the hold cancellation message for the user the instant that the action determination unit has switched the state of the call from the hold state to the call state.

12. The in-vehicle hands-free apparatus according to claim 1,
wherein the storage unit has a storage area divided into a plurality of areas for storing the voice of the party uttered during the call, and
said voice of the party is divided into sections and stored in the plurality of areas so that the divided sections of the voice partly overlap each other.

13. A hands-free call method for making a hands-free call using a telephone in a vehicle, the hands-free call being a telephone communication between a user of the in-vehicle hands-free apparatus at one end of the telephone communication and a party on another end of the telephone communication, said hands-free call method comprising:
a recording step of recording a voice of the party on the other end of the telephone communication between the user and the party uttered during the telephone communication between the user and the party;
a situation analysis step of analyzing a surrounding situation of the vehicle based on information outputted from at least one sensor for detecting the surrounding situation;
an action determination step of switching a state of the call between a user of the telephone and the party by selecting either a call state in which output of the voice of the party on the other end of the telephone communication is enabled or a hold state in which output of the voice of the party on the other end of the telephone communication is suspended, based on a result of the analysis in the situation analysis step; and
a playback output step of, when the state of the call is switched from the hold state to the call state after being switched from the call state to the hold state in the action determination step: (a) continuing suspending the output of the voice of the party on the other end of the telephone communication and playing back the voice of the party that was recorded in the recording step after the state of the call was switched to the hold state by the action determination step; and (b) thereafter enabling outputting of the voice of the party on the other end of the telephone communication for the user.

14. The hands-free call method according to claim 13,
wherein in the playback output step, the voice of the party recorded in the recording step is played back, starting from a section of said voice stored at a point of time before the state of the call is switched from the call state to the hold state in the action determination step.

15. The hands-free call method according to claim 13,
wherein the playback output step includes:
a hold time measurement substep of measuring a hold time from a point of time when the state of the call is switched from the call state to the hold state until a point of time when the state of the call is switched from the hold state to the call state in the action determination step; and
a playback control substep of determining not to play back the voice of the party recorded in the recording step in a case where the hold time measured in the hold time measurement substep is shorter than a predetermined threshold.

16. The hands-free call method according to claim 13,
wherein the playback output step includes:
a playback speed control substep of controlling a playback speed of the voice of the party recorded in the recording step; and an elapsed time measurement substep of measuring a time which has elapsed since the state of the call was switched from the call state to the hold state in the action determination step, and
in the playback speed control step, the voice of the party is played back at a speed faster than normal speed in a case where the elapsed time measured in the elapsed time measurement substep is equal to or longer than a predetermined threshold.

17. The hands-free call method according to claim 13, further comprising:
a first message generation step of generating, when the state of the call is switched from the call state to the hold state in the action determination step, a voice delivery message notifying that the voice of the party uttered during the hold state including a point of time of the switching is delivered to the user; and
a sending step of sending the voice delivery message to a communication apparatus of the party.

18. The hands-free call method according to claim 13, further comprising a second message generation step of generating a playback message notifying that the playback of the voice of the party recorded in the recording step is to be started,
wherein in the playback output step, the playback message is played back and outputted for the user before the playback of said voice is started.

19. A program for an in-vehicle hands-free apparatus for making a hands-free call using a telephone in a vehicle, the hands-free call being a telephone communication between a user of the in-vehicle hands-free apparatus at one end of the telephone communication and a party on another end of the telephone communication, the program being recorded on a computer-readable medium and causing a computer to execute a method comprising:
a recording step of recording a voice of the party on the other end of the telephone communication between the user and the party uttered during the telephone communication between the user and the party;
a situation analysis step of analyzing a surrounding situation of the vehicle based on information outputted from at least one sensor for detecting the surrounding situation;
an action determination step of switching a state of the call between a user of the telephone and the party by selecting either a call state in which output of the voice of the party on the other end of the telephone communication is enabled or a hold state in which output of the voice of the party on the other end of the telephone communication is suspended, based on a result of the analysis in the situation analysis step; and
a playback output step of, when the state of the call is switched from the hold state to the call state after being switched from the call state to the hold state in the action determination step: (a) continuing suspending the output of the voice of the party on the other end of the telephone communication and playing back the voice of the party that was recorded in the recording step after the state of the call was switched to the hold state by the action determination step; and (b) thereafter enabling outputting of the voice of the party on the other end of the telephone communication for the user.

* * * * *